United States Patent
Hatakeyama et al.

(10) Patent No.: US 11,194,429 B2
(45) Date of Patent: Dec. 7, 2021

(54) INFORMATION DISPLAY TERMINAL

(71) Applicant: Panasonic Intellectual Property Management Co., Ltd., Osaka (JP)

(72) Inventors: Takeshi Hatakeyama, Osaka (JP); Masaharu Matsumoto, Osaka (JP); Kaname Tomita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/011,383

(22) Filed: Sep. 3, 2020

(65) Prior Publication Data

US 2021/0072852 A1 Mar. 11, 2021

Related U.S. Application Data

(60) Provisional application No. 62/896,534, filed on Sep. 5, 2019.

(51) Int. Cl.
*G06F 3/044* (2006.01)

(52) U.S. Cl.
CPC .... *G06F 3/044* (2013.01); *G06F 2203/04102* (2013.01)

(58) Field of Classification Search
CPC .......................... G06F 3/044; G06F 2203/04102
See application file for complete search history.

(56) References Cited

U.S. PATENT DOCUMENTS

| | | |
|---|---|---|
| 9,013,515 B2 | 4/2015 | Joseph et al. |
| 2005/0057526 A1 | 3/2005 | Kinoshita et al. |
| 2008/0285128 A1 | 11/2008 | Nieuwkerk et al. |
| 2009/0001573 A1 | 1/2009 | Weller et al. |
| 2009/0096937 A1 | 4/2009 | Bauer et al. |
| 2009/0097145 A1 | 4/2009 | Fujii et al. |
| 2009/0243824 A1 | 10/2009 | Peterson et al. |
| 2011/0115731 A1 | 5/2011 | Kuwajima |
| 2012/0139956 A1 | 6/2012 | Joseph et al. |

(Continued)

FOREIGN PATENT DOCUMENTS

| | | |
|---|---|---|
| CN | 203825589 | 9/2014 |
| CN | 207232925 | 4/2018 |

(Continued)

OTHER PUBLICATIONS

Extended European Search Report dated Feb. 1, 2021 in European Application No. 20194390.9.

(Continued)

*Primary Examiner* — Michael Pervan
(74) *Attorney, Agent, or Firm* — Wenderoth, Lind & Ponack, L.L.P.

(57) ABSTRACT

An information display terminal includes a surface member, a touch panel, and an information terminal body. The surface member is to be fixed to a structure. The touch panel is configured to be curved and has a first surface and a second surface that are opposite to each other. The first surface is adhered to the surface member. The information terminal body is to be attached to the structure and is configured to receive an input from the touch panel. The second surface of the touch panel is apart from the information terminal body. The information terminal body is configured to be removable from the structure.

20 Claims, 7 Drawing Sheets

(56) References Cited

U.S. PATENT DOCUMENTS

| | | | |
|---|---|---|---|
| 2012/0274575 A1 | 11/2012 | Solomon et al. | |
| 2014/0022390 A1 | 1/2014 | Blank et al. | |
| 2014/0012603 A1 | 5/2014 | Neuman et al. | |
| 2015/0153862 A1 | 6/2015 | Nakamura et al. | |
| 2015/0241917 A1* | 8/2015 | Seok | A61B 5/681 361/679.03 |
| 2015/0253612 A1 | 9/2015 | Hasegawa et al. | |
| 2016/0002603 A1 | 1/2016 | Sakai et al. | |
| 2016/0111028 A1 | 4/2016 | Lee et al. | |
| 2016/0292917 A1 | 10/2016 | Dorner et al. | |
| 2016/0360167 A1 | 12/2016 | Mitchell et al. | |
| 2017/0059917 A1* | 3/2017 | Kao | G02F 1/133308 |
| 2017/0082895 A1 | 3/2017 | Sakai et al. | |
| 2018/0341293 A1 | 11/2018 | Kim | |
| 2019/0004569 A1 | 1/2019 | Jin et al. | |
| 2019/0114021 A1* | 4/2019 | Oliver | G06F 3/044 |
| 2020/0057525 A1* | 2/2020 | Prest | G06F 1/1686 |
| 2020/0380933 A1* | 12/2020 | Yamazaki | G06F 1/1652 |

FOREIGN PATENT DOCUMENTS

| | | |
|---|---|---|
| EP | 3007156 | 4/2016 |
| EP | 3244258 | 11/2017 |
| JP | 2002-23674 | 1/2002 |
| JP | 2002-140632 | 5/2002 |
| JP | 2002-156912 | 5/2002 |
| JP | 2005-18582 | 1/2005 |
| JP | 2005-74554 | 3/2005 |
| JP | 2007-34736 | 2/2007 |
| JP | 2008-111984 | 5/2008 |
| JP | 2008-208702 | 9/2008 |
| JP | 2009-294871 | 12/2009 |
| JP | 2010-20682 | 1/2010 |
| JP | 2011-107389 | 6/2011 |
| JP | 2011-145921 | 7/2011 |
| JP | 2012-88908 | 5/2012 |
| JP | 2012-118513 | 6/2012 |
| JP | 2014-77821 | 5/2014 |
| JP | 2014-199472 | 10/2014 |
| JP | 2015-11202 | 1/2015 |
| JP | 2015-106045 | 6/2015 |
| JP | 2015-132688 | 7/2015 |
| JP | 2015-232685 | 12/2015 |
| JP | 2016-161761 | 9/2016 |
| JP | 2016-206400 | 12/2016 |
| JP | 6122450 | 4/2017 |
| JP | 2019-56735 | 4/2019 |
| JP | 2019-152695 | 9/2019 |
| WO | 2007/072392 | 6/2007 |
| WO | 2008/012727 | 1/2008 |
| WO | 2008/104905 | 9/2008 |
| WO | 2014/050138 | 4/2014 |
| WO | 2016/183059 | 11/2016 |

OTHER PUBLICATIONS

Office Action dated Feb. 16, 2021 in U.S. Appl. No. 16/826,706.
Extended European Search Report dated Sep. 15, 2020 in corresponding European Patent Application No. 20159093.2.
Extended European Search Report dated Sep. 15, 2020 in corresponding European Patent Application No. 20164503.3.
Extended European Search Report dated Sep. 17, 2020 in corresponding European Patent Application No. 20159505.5.
Extended European Search Report dated Sep. 21, 2020 in corresponding European Patent Application No. 20164505.8.
Extended European Search Report dated Sep. 22, 2020 in corresponding European Patent Application No. 20159092.4.
Extended European Search Report dated Sep. 24, 2020 in corresponding European Patent Application No. 20164501.7.
Extended European Search Report dated May 3, 2021 in European Application No. 20209744.0.
Office Action dated Aug. 12, 2021 in U.S. Appl. No. 16/826,736.
Office Action dated Sep. 8, 2021 in U.S. Appl. No. 16/826,706.

* cited by examiner

INFORMATION DISPLAY TERMINAL

BACKGROUND

1. Technical Field

The present disclosure relates to an information display terminal that includes a touch panel.

2. Description of the Related Art

Displays like liquid crystal displays (LCD) and organic light emitting diode (OLED) displays are widely used both for consumer and industrial usages. Such a display is used in combination with a semi-transparent surface member on which a design is printed. The printed design on the surface member may look like fabric, wood, leather and so forth. The display is located underneath the surface member. When the display is turned off, a viewer can see the printed design of the surface member. On the other hand, the viewer can see a mixed image of the printed design and the screen shown by the display when the display is turned on. For instance, variable text information and operational information like buttons can be shown by the display in combination with fixed designs like fabric, wood, leather and so on.

For example, U.S. Pat. No. 9,013,515 discloses a configuration in which a semi-transparent surface member is located in front of a display. According to this configuration, a mixed image of a default screen of the surface member and a screen of the display becomes visible when the display is turned on.

SUMMARY

In case a touch panel is necessary for a conventional structure including a surface member and a flat display, the touch panel is located on the flat display. According to this conventional structure, there is an air gap between the surface member and the touch panel. Even if the display having the touch panel is forced to be adhered to the surface member by a mechanical method, it is difficult to adhere the display to the surface member without an air gap. Specially, if the display surface is flat and the surface member is curved, it is very difficult to adhere the touch panel, which is on the flat display, to the curved surface member without an air gap.

An information display terminal according to the present disclosure includes a surface member, a touch panel, and an information terminal body. The surface member is to be fixed to a structure. The touch panel is configured to be curved, and has a first surface and a second surface that are opposite to each other. The first surface is adhered to the surface member. The information terminal body is to be attached to the structure and is configured to receive an input from the touch panel. The second surface of the touch panel is apart from the information terminal body. The information terminal body is configured to be removable from the structure.

According to the disclosed information display terminal, the touch panel, which is flexible and apart from the information terminal body, can be adhered to the surface member without an air gap. Thus, the touch panel can detect a touch operation on the surface member without fail.

DETAILED DESCRIPTION

Hereinafter, an exemplary embodiment will be described in detail with reference to the drawings as appropriate. However, detailed description beyond necessity may be omitted. For example, detailed description of a matter that has been already known well or overlapping description of substantially the same configuration may be omitted. Such omissions are aimed to prevent the following description from being redundant more than necessary, and to help those skilled in the art easily understand the following description.

It should be noted that the inventor of the present disclosure provides the attached drawings and the following description for those skilled in the art to fully understand the present disclosure, and the attached drawings and the following description are not intended to limit the subject matter as described in the appended claims.

Figure 1:
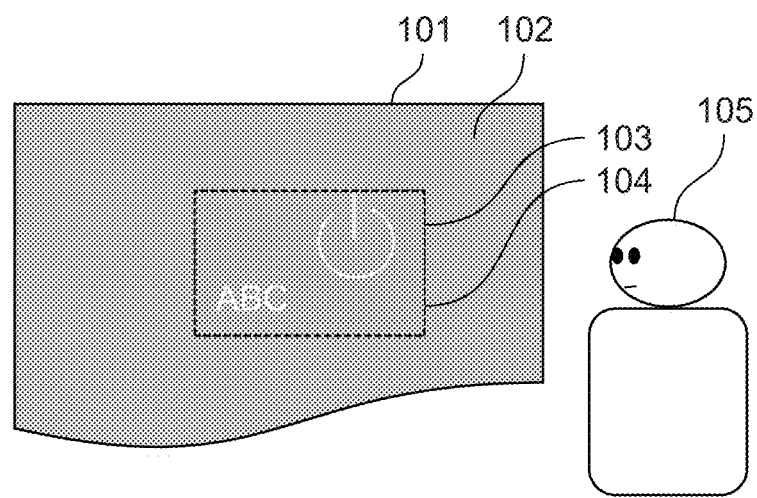
FIG. 1 is an outside appearance of an information display terminal according to a first embodiment.

1. First Embodiment 1-1. Outside Appearance and Overall Operations of Information Display Terminal FIG. 1 illustrates an outside appearance of an information display terminal according to a first embodiment. The outside appearance and overall operations of the information display terminal according to this embodiment will be described hereinafter on the basis of FIG. 1.

From the outside, operator 105 can view only surface member 102 of information display terminal 101. Surface member 102 has a printed design like fabric, wood, leather and so forth on it. Therefore, operator 105 views the printed design of surface member 102.

Underneath (i.e., behind) surface member 102, information display terminal 101 includes display 103 and capacitive touch panel 104. Surface member 102 is semi-transparent. Surface member 102 includes a wall surface. The wall surface transmits light from display 103. Therefore, it is possible for operator 105 to see information like text, graphics and operational environment (buttons), which are shown by display 103 through surface member 102. Actually, what operator 105 can view is a mixed image of the printed design on surface member 102 and a screen shown by display 103. In FIG. 1, operator 105 can view a text "ABC" and a power button, which are displayed by display 103, on surface member 102.

Operator 105 executes an operation by using capacitive touch panel 104. In FIG. 1, operator 105 can execute a power operation by touching the power button shown on surface member 102. By this operation, capacitive touch panel 104 senses that operator 105 touches the position of the power button, and information display terminal 101 executes an operation selected by operator 105. Because capacitive touch panel 104 is a capacitive type touch panel, it is able to sense operator 105's fingers through surface member 102.

1-2. Configuration and Operation of Information Display Terminal

Figure 2:
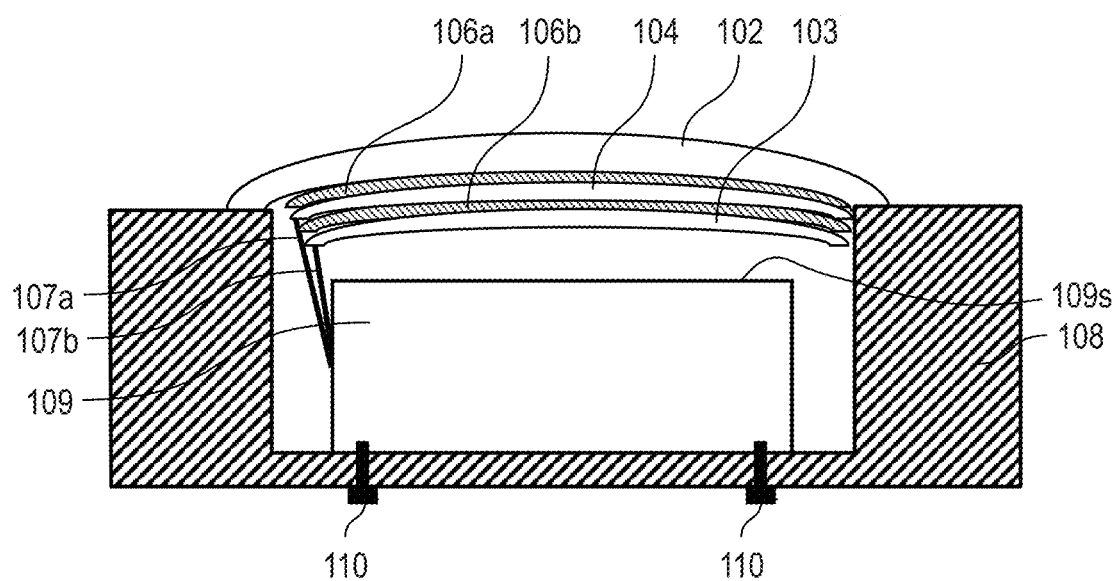
FIG. 2 shows the information display terminal according to the first embodiment.

FIG. 2 is a configuration of an information display terminal according to the first embodiment. The configuration and operations of the information display terminal according to this embodiment will be described hereinafter on the basis of FIG. 2.

The information display terminal includes surface member 102, capacitive touch panel 104, adhesive 106a, display 103, adhesive 106b, flexible cable 107a, flexible cable 107b, structure 108, information terminal body 109, and one or more screws 110. The one or more screws 110 are examples of fixing tools. Instead of screws 110, bolts and nuts may be used as fixing tools. Touch panel 104 has a first surface and a second surface that are opposite to each other.

Information terminal body 109 includes a casing within which is a main processing part for the information display terminal. Information terminal body 109 is attached to structure 108 by using one or more screws 110. Specifically, the casing of information terminal body 109 is attached to structure 108 by screws 110. This means that information terminal body 109 is removable from structure 108 if there is a necessity like a case of maintenance. As shown in FIG. 2, information terminal body 109 is surrounded by structure 108.

Information terminal body 109 executes objective processing for the information display terminal. Information terminal body 109 receives input information from capacitive touch panel 104 via flexible cable 107a, and transmits display information to display 103 via flexible cable 107b.

Surface member 102 is fixed to a top surface of structure 108. Surface member 102 has a curved surface. And capacitive touch panel 104 is a flexible film based capacitive touch panel. Thus, capacitive touch panel 104 is a flexible touch sensor including a flexible film. Therefore, capacitive touch panel 104 can be curved so that capacitive touch panel 104 can be adhered to the curved surface of surface member 102. The first surface of touch panel 104 is adhered to the curved surface of surface member 102 by adhesive 106a. Here, the first surface of touch panel 104 is adhered to the curved surface of surface member 102 such that the curvature of the first surface of touch panel 104 is identical to the curvature of the curved surface of surface member 102. The second surface of touch panel 104 is apart from information terminal body 109. Capacitive touch panel 104 is electrically connected to information terminal body 109 by flexible cable 107a. According to this structure, information terminal body 109 can receive touch input information from capacitive touch panel 104 and process it. Because capacitive touch panel 104 is apart from information terminal body 109 and is flexible, capacitive touch panel 104 can be curved and adhered to surface member 102 without any air gap between surface member 102 and capacitive touch panel 104, by using adhesive 106a. If there is an air gap between surface member 102 and capacitive touch panel 104, it is difficult for capacitive touch panel 104 to respond to operator 105's fingers touching surface member 102. However, by using a flexible and physically independent touch panel as capacitive touch panel 104, it becomes possible for capacitive touch panel 104 to be adhered to the curved surface of surface member 102 without an air gap and realize a certain operation.

In this embodiment, display 103 is also a flexible film based one. Thus, display 103 is a flexible display. Nowadays, film based flexible OLED displays are prevalent and are being widely used. Display 103 can be curved to be adhered to the curved surface of surface member 102. Display 103 has a first surface and a second surface. The first and second surfaces are opposite to each other. The first surface of display 103 is adhered to the second surface of the capacitive touch panel 104 by adhesive 106b. The second surface of display 103 faces information terminal body 109 and is apart from information terminal body 109. Specifically, the second surface of display 103 faces top surface 109s of the casing of information terminal body 109 and is apart from top surface 109s. As shown in FIG. 2, the information display terminal of the present embodiment may include only air between the second surface of display 103 and top surface 109s.

Display 103 is electrically connected to information terminal body 109 by flexible cable 107b. Therefore, information terminal body 109 transmits display information (text, graphics, and operational environment) to display 103 via flexible cable 107b. And display 103 displays a screen based on the display information transmitted from information terminal body 109. In other words, CPU 111 of information terminal body 109 receives an input from capacitive touch panel 104 via flexible cable 107b, to cause display 103 to display information. CPU 111 receives the input from capacitive touch panel 104 via flexible cable 107a, to control display 103. Because display 103 is apart from information terminal body 109 and is flexible, display 103 can be curved and adhered to both surface member 102 and capacitive touch panel 104 without an air gap by using adhesive 106b. If there is an air gap between capacitive touch panel 104 and display 103, unclear and/or distorted display image may be presented on surface member 102. However, by using a flexible and physically independent display as display 103, it becomes possible for display 103 to be adhered to both the curved surface of surface member 102 and the curved surface of capacitive touch panel 104 without an air gap.

As illustrated in FIG. 2, surface member 102 is fixed to a top surface of structure 108 to form an inner space. Information terminal body 109 is stored in the inner space. Specifically, information terminal body 109 is attached to a bottom of structure 108.

Structure 108 may have a printed design on the top surface. In one embodiment, the printed design of structure 108 may be identical to the printed design of surface member 102. For example, surface member 102 and structure 108 both have a printed design of wood. In another embodiment, the printed design of structure 108 may be different from the printed design of surface member 102.

Figure 3:
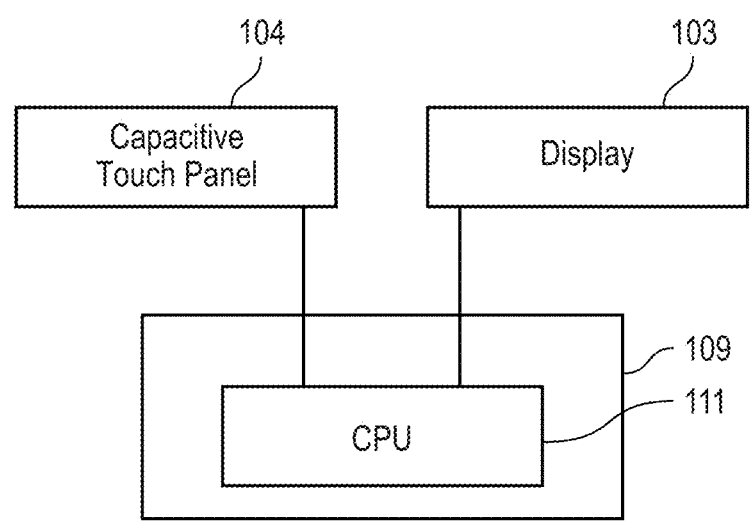
FIG. 3 is a functional block diagram of the information display terminal according to the first embodiment.

1-3. Functional Block Diagram and Functional Operation of Information Display Terminal FIG. 3 is a functional block diagram of the information display terminal according to the first embodiment. The functional block diagram and functional operations of the information display terminal according to this embodiment will be described hereinafter on the basis of FIG. 3

The information display terminal includes capacitive touch panel 104, display 103, and information terminal body 109. And information terminal body 109 includes central processing unit (CPU) 111 in the casing of information terminal body 109.

CPU 111 manages a status of the information display terminal. And CPU 111 transmits display information to display 103 depending on the status of the information display terminal.

Capacitive touch panel 104 senses operator's inputs (fingers) and transmits operator input information to CPU 111. After CPU 111 receives the operation input information, CPU 111 processes the operator input information and changes the status of the information display terminal. And depending on the status, CPU 111 updates display information and transmits the updated information to display 103.

Through these functional operations, the information display terminal can realize the proper information presentation to operator 105 based on the operator 105's input.

1-4. Effects, Etc.

With the information display terminal according to the first embodiment as described thus far, both capacitive touch panel 104 and display 103 are adhered to surface member 102 without an air gap. Accordingly, capacitive touch panel 104 can detect a touch operation through surface member 102 more certainly. Further, operator 105 can see a clearer image, which is displayed by display 103, through surface member 102.

2. Second Embodiment 2-1. Outside Appearance and Overall Operations of Information Display Terminal An outside appearance and overall operations of an information display terminal are the same as those of the first embodiment shown by FIG. 1.

2-2. Configuration and Operation of Information Display Terminal

Figure 4:
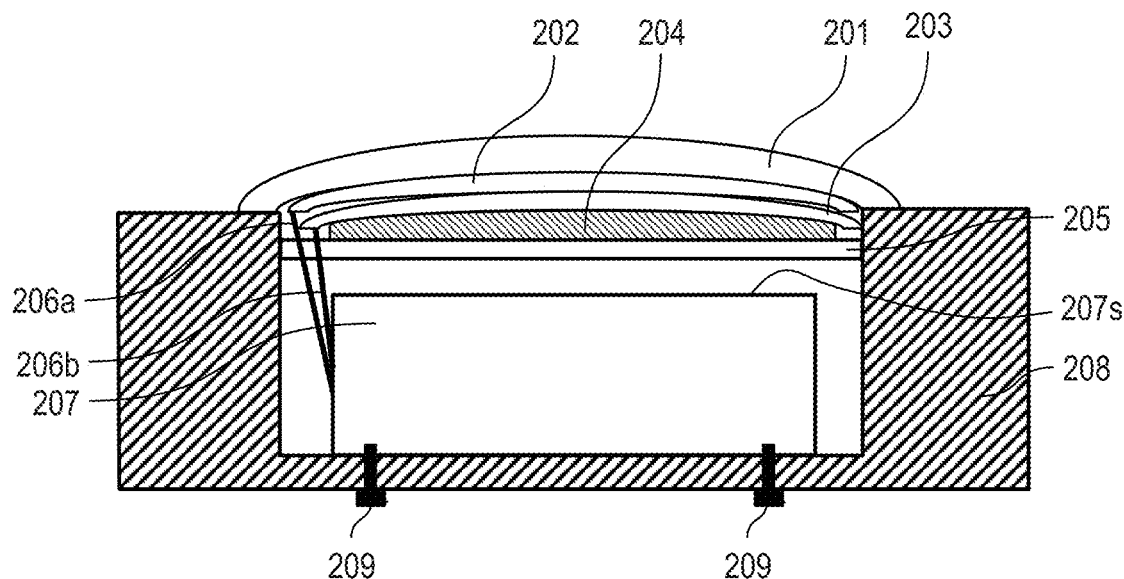
FIG. 4 shows an information display terminal according to a second embodiment.

FIG. 4 is a configuration of an information display terminal according to a second embodiment. The configuration and operations of the information display terminal according to this embodiment will be described hereinafter on the basis of FIG. 4.

The information display terminal includes surface member 201, capacitive touch panel 202, display 203, cushion member 204, cushion pressing member 205, flexible cable 206a, flexible cable 206b, information terminal body 207, structure 208, and one or more screws 209.

Basic configuration and operations of the information display terminal is almost the same as those of the first embodiment according to FIG. 2.

A difference from the first embodiment is an adhering method of capacitive touch panel 202 and display 203. Instead of using adhesives according to the first embodiment, cushion member 204, which has elasticity and is located underneath capacitive touch panel 202 and the display 203, is used for adhering. In other words, an adhesive is not used for the adhering method according to the present embodiment. Cushion member 204 is pressed in an upper direction (a direction toward surface member 201) by cushion pressing member 205. In other words, cushion pressing member 205 presses cushion member 204 toward surface member 201 such that the first surface of capacitive touch panel 202 is adhered to surface member 201 and the first surface of display 203 is adhered to the second surface of capacitive touch panel 202. Cushion member 204 is in contact with the second surface of capacitive touch panel 202. As shown in FIG. 4, the information display terminal of the present embodiment may include only air between cushion pressing member 205 and top surface 207s of the casing of information terminal body 207.

Cushion pressing member 205 is made of stiff material and fixed to structure 208. One material example of cushion member 204 is silicone gel material. Silicone gel material is very soft. Thus, the material of cushion pressing member 205 is stiffer than the material of cushion member 204. And when cushion member 204, which is made of soft material, is pressed by stiff cushion pressing member 205 toward stiff surface member 201, the shape of cushion member 204 fits into the shape of surface member 201. Thus, cushion member 204 can fit into the curved surface of surface member 201. As a result, capacitive touch panel 202 can be curved and adhered to surface member 201 without an air gap between touch panel 202 and surface member 201. Further, display 203 can be curved and adhered to capacitive touch panel 202 without an air gap between display 203 and capacitive touch panel 202. Through the explained configuration and operations, a certain operation of capacitive touch panel 202 and a clear and non-distorted screen by display 203 become possible.

2-3. Function Block and Functional Operation of Information Display Terminal

Functional block and functional operation of an information display terminal are the same as those of the first embodiment shown by FIG. 3.

2-4. Effects, Etc.

With the information display terminal according to the second embodiment as described thus far, both capacitive touch panel 202 and display 203 are adhered to surface member 201 without an air gap. Accordingly, capacitive touch panel 202 can detect a touch operation through surface member 201 more certainly. Further, an operator can see a clearer image, which is displayed by display 203, through surface member 201.

3. Third Embodiment 3-1. Outside Appearance and Overall Operations of Information Display Terminal An outside appearance and overall operations of an information display terminal are the same as those of the first embodiment shown by FIG. 1.

3-2. Configuration and Operation of Information Display Terminal

Figure 5:
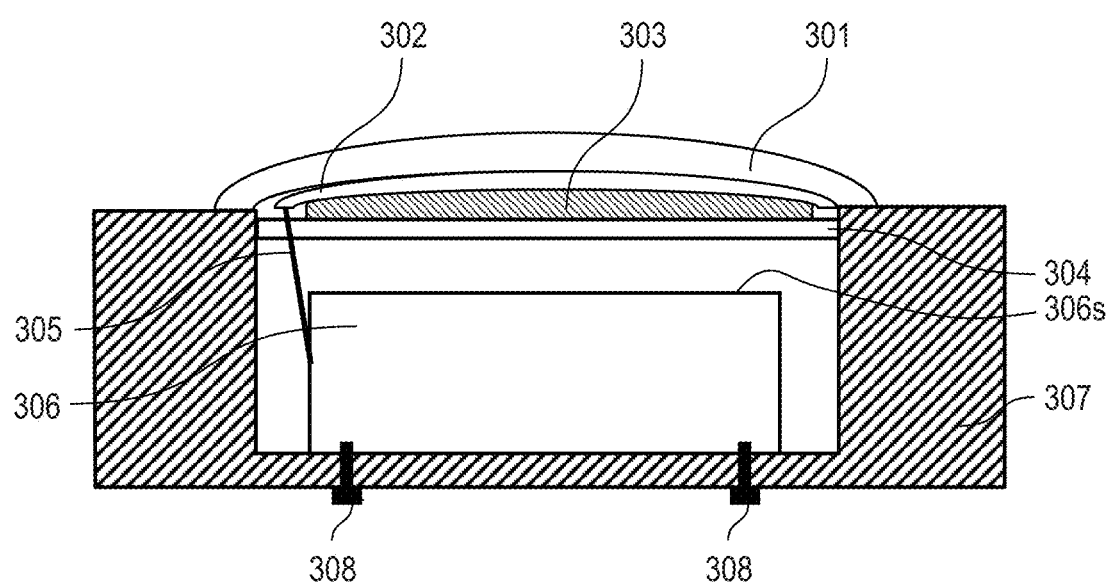
FIG. 5 shows an information display terminal according to a third embodiment.

FIG. 5 is a configuration of an information display terminal according to a third embodiment. The configuration and operations of the information display terminal according to this embodiment will be described hereinafter on the basis of FIG. 5.

The information display terminal includes surface member 301, capacitive touch panel 302, cushion member 303, cushion pressing member 304, flexible cable 305, information terminal body 306, structure 307, and one or more screws 308. Capacitive touch panel 302 has a first surface and a second surface that are opposite to each other.

Basic configuration and operations of the information display terminal are almost the same as those of the second embodiment according to FIG. 4.

A difference from the second embodiment is a location of a display. According to this embodiment, information terminal body 306 includes display 309 (see FIG. 6). Display 309 has display surface 306s which is also a top surface of information terminal body 306. Display 309, which is included in information terminal body 306, displays a screen toward surface member 301. Capacitive touch panel 302 is adhered to surface member 301 by cushion member 303 and cushion pressing member 304 without an air gap. Thus, capacitive touch panel 302 is adhered to surface member 301 without adhesive due to pressing via the cushion member 303 and the cushion pressing member 304 without an air gap between capacitive touch panel 302 and surface member 301. Alternatively, capacitive touch panel 302 can be adhered to surface member 301 due to pressing via the cushion member 303 and the cushion pressing member 304 in addition to use of adhesive. The first surface of capacitive touch panel 302 is in contact with surface member 301. The second surface of capacitive touch panel 302 is in contact with cushion member 303. According to this embodiment, cushion member 303 and cushion pressing member 304 are optically transparent so that an operator can view an image, which is displayed by display 309 of information terminal body 306. Specifically, the operator can view the image through surface member 301, capacitive touch panel 302, cushion member 303, and cushion pressing member 304. In other words, cushion member 303 and cushion pressing member 304 transmit light from display surface 309s of display 309.

Through the explained configuration and operations, a certain operation of capacitive touch panel 302 becomes possible.

3-3. Function Block and Functional Operation of Information Display Terminal

Figure 6:
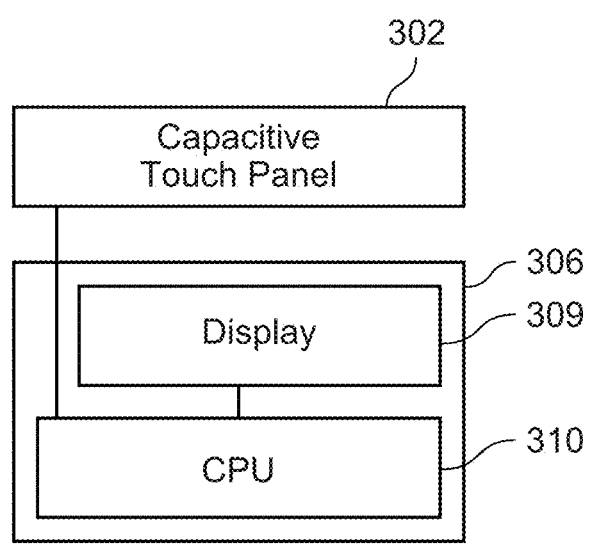
FIG. 6 is a functional block diagram of the information display terminal according to the third embodiment.

FIG. 6 is a functional block diagram of the information display terminal according to the third embodiment. The functional block diagram and functional operations of the information display terminal according to this embodiment will be described hereinafter on the basis of FIG. 6.

The information display terminal includes capacitive touch panel 302, and information terminal body 306. And information terminal body 306 includes display 309 and CPU 310. Display 309 displays information on display surface 309s. Display surface 309s faces the second surface of capacitive touch panel 302. CPU 310 receives an input from capacitive touch panel 302 to control display 309.

CPU 310 manages a status of information display terminal. And the CPU 310 transmits display information to display 309 per the status of the information display terminal.

Capacitive touch panel 302 senses an operator's input (finger) and transmits operator input information to CPU 310. After CPU 310 receives the operation input information, CPU 310 processes the operator input information and change the status of the information display terminal. And depending on the status, CPU 310 updates display information and transmit the updated information to display 309. Display 309 of information terminal body 306 receives an input from capacitive touch panel 302 to display information on display surface 309s of display 309.

Through these functional operations, the information display terminal can realize the proper information presentation to the operator based on the operator input.

3-4. Effects, Etc.

With the information display terminal according to the third embodiment as described thus far, capacitive touch panel 302 is adhered to surface member 301 without an air gap between capacitive touch panel 302 and surface member 301. Accordingly, capacitive touch panel 302 can detect a touch operation through surface member 301 more certainly.

4. Fourth Embodiment 4-1. Outside Appearance and Overall Operations of Information Display Terminal Outside appearance and overall operations of an information display terminal are almost the same as those of the first embodiment shown by FIG. 1. But, the information display terminal does not include a capacitive touch panel according to this embodiment. Information appears on surface member 401. But, the information display terminal of this embodiment does not detect a touch operation of an operator.

4-2. Configuration and Operation of Information Display Terminal

Figure 7:
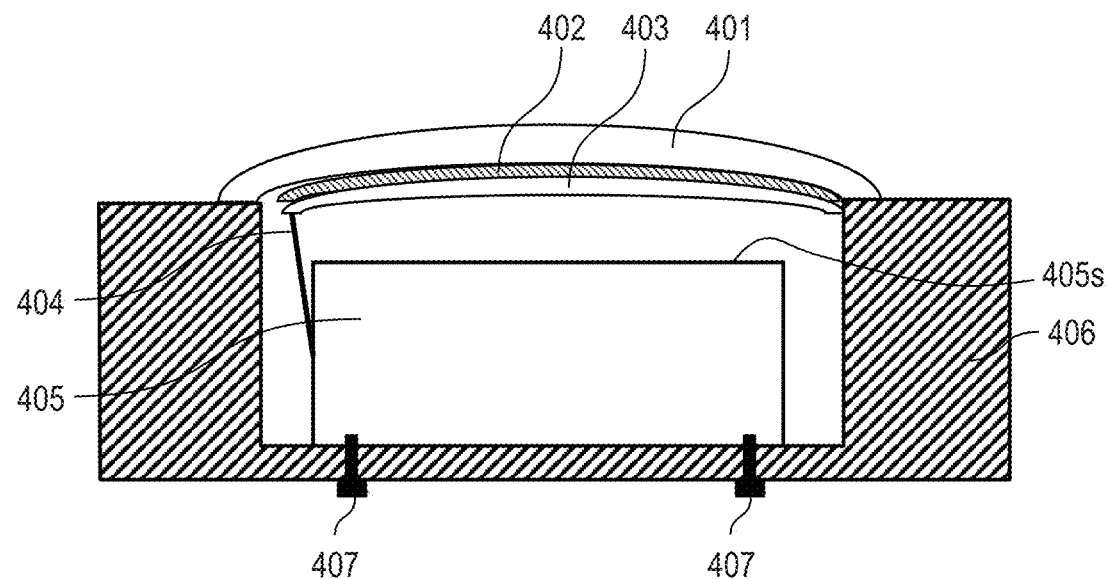
FIG. 7 shows an information display terminal according to a fourth embodiment.

FIG. 7 is a configuration of an information display terminal according to the fourth embodiment. The configuration and operations of the information display terminal according to this embodiment will be described hereinafter on the basis of FIG. 7.

The information display terminal includes surface member 401, adhesive 402, display 403, flexible cable 404, information terminal body 405, structure 406, and one or more screws 407. Display 403 has a first surface and a second surface that are opposite to each other.

Basic configuration and operations of the information display terminal is almost the same as those of the first embodiment according to FIG. 1.

A difference from the first embodiment is that the information display terminal does NOT include a capacitive touch panel. Display 403, which is a flexible display, is adhered to surface member 401 by adhesive 402 without an air gap between display 403 and surface member 401. Specifically, the first surface of display 403 is adhered to a curved surface of surface member 401 by adhesive 402. The second surface of display 403 faces information terminal body 405 and is apart from information terminal body 405. As shown in FIG. 7, the information display terminal of the present embodiment may include only air between the second surface of display 403 and top surface 405s of the casing of information terminal body 405.

By the explained configuration and operations, a clear and non-distorted screen by display 403 through surface member 401 can be realized.

4-3. Function Block and Functional Operation of Information Display Terminal

Figure 8:
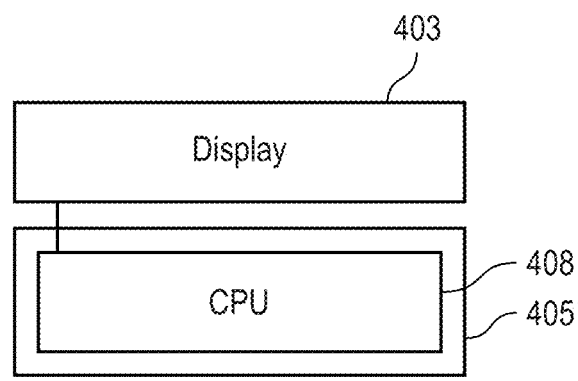
FIG. 8 is a functional block diagram of the information display terminal according to the fourth embodiment.

FIG. 8 is a functional block of an information display terminal according to the fourth embodiment. The functional block and functional operations of the information display terminal according to this embodiment will be described hereinafter on the basis of FIG. 8.

The information display terminal includes display 403, and information terminal body 405. And information terminal body 405 includes CPU 408.

CPU 408 manages a status of information display terminal. And CPU 408 transmits display information to display 403 based on the status of the information display terminal.

Through these functional operations, the information display terminal can realize the proper information presentation to the operator based on its status.

4-4. Effects, Etc.

With the information display terminal according to the fourth embodiment as described thus far, display 403 is adhered to surface member 401 without an air gap between display 403 and surface member 401. Accordingly, an operator can see a clearer image, which is displayed by display 403, through surface member 401.

5. Other Embodiments

The aforementioned first, second, third, and fourth embodiments have been described as examples of the technique disclosed in this application. However, the technique according to this disclosure is not limited thereto, and can also be applied in embodiments in which the aforementioned details have been changed, replaced, added, or removed as appropriate. The constituent elements and functions described in the aforementioned first, second, third, and fourth embodiments can also be combined in order to obtain new embodiments.

Although the foregoing embodiments are described as examples in which the surface member is assumed to have a curved surface, the present disclosure is useful to a case that a surface member has a flat surface. The flexible and physically independent touch panel and the flexible and physically independent display are effective to remove any air gap for adhering the touch panel and display to the flat surface member. This is because the flat surface member usually has some roughness on it and it is usually difficult to attach the flat surface member to the flat capacitive touch panel (or the flat display) without an air gap.

Figure 9:
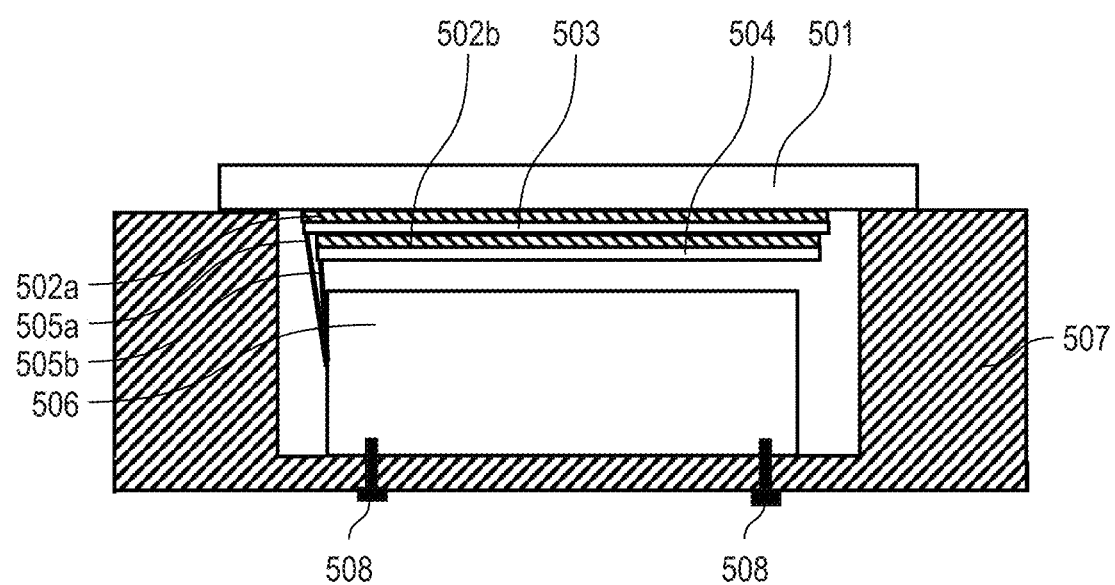
FIG. 9 is a first configuration of an information display terminal according to other embodiments.

FIG. 9 is a first structure of an information display terminal according to other embodiments. According to FIG. 9, the information display terminal includes surface member 501, adhesive 502a, capacitive touch panel 503, adhesive 502b, display 504, flexible cable 505a, flexible cable 505b, information terminal body 506, structure 507, and one or more screws 508. Basic configuration and operations of the information display terminal is the same as those of the first embodiment according to FIG. 2. The difference is the surface of surface member 501. Here, the surface of surface member 501 is flat, and is not curved. Even for this structure, physically independent capacitive touch panel 503, which is a flexible touch sensor, and physically independent display 504, which is a flexible display, are effective to remove any air gap between surface member 501 and capacitive touch panel 503.

Figure 10:
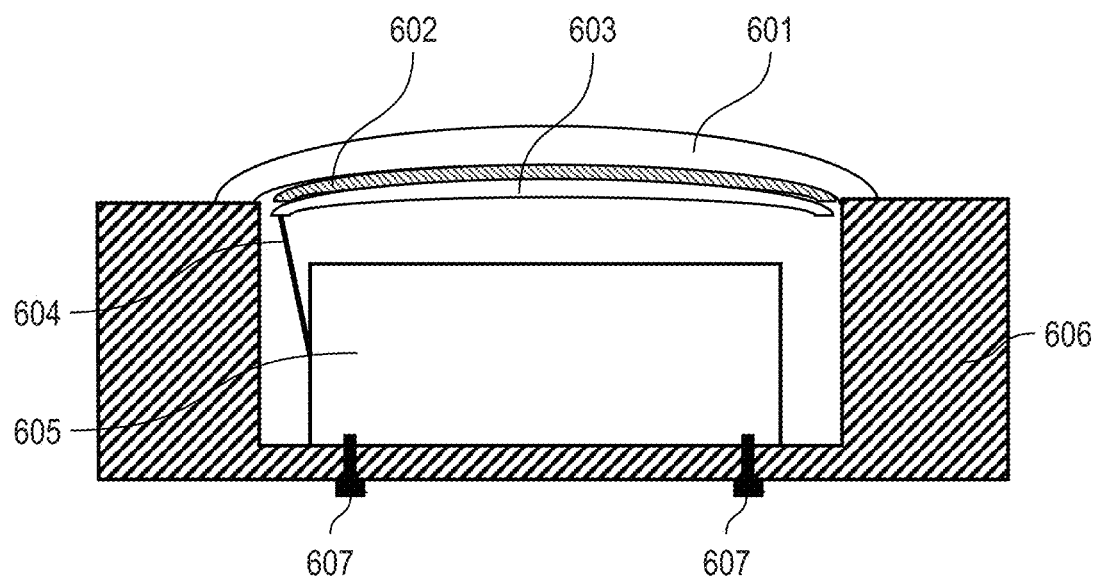
FIG. 10 is a second configuration of the information display terminal according to other embodiments.

The present disclosure is also useful to a case that adhered part is only a touch panel (the information terminal body includes a display) and an adhering method is an adhesive. FIG. 10 is a second structure of the information display terminal according to other embodiments. According to FIG. 10, the information display terminal includes surface member 601, adhesive 602, capacitive touch panel 603, flexible cable 604, information terminal body 605, structure 606, and one or more screws 607. Basic configuration and operations of the information display terminal is the same as those of the third embodiment according to FIG. 5. But, adhesive 602 is used as an adhering method instead of using a cushion member and a cushion pressing member. Specifically, the first surface of capacitive 603 is adhered to surface member 601 by adhesive 602.

Figure 11:
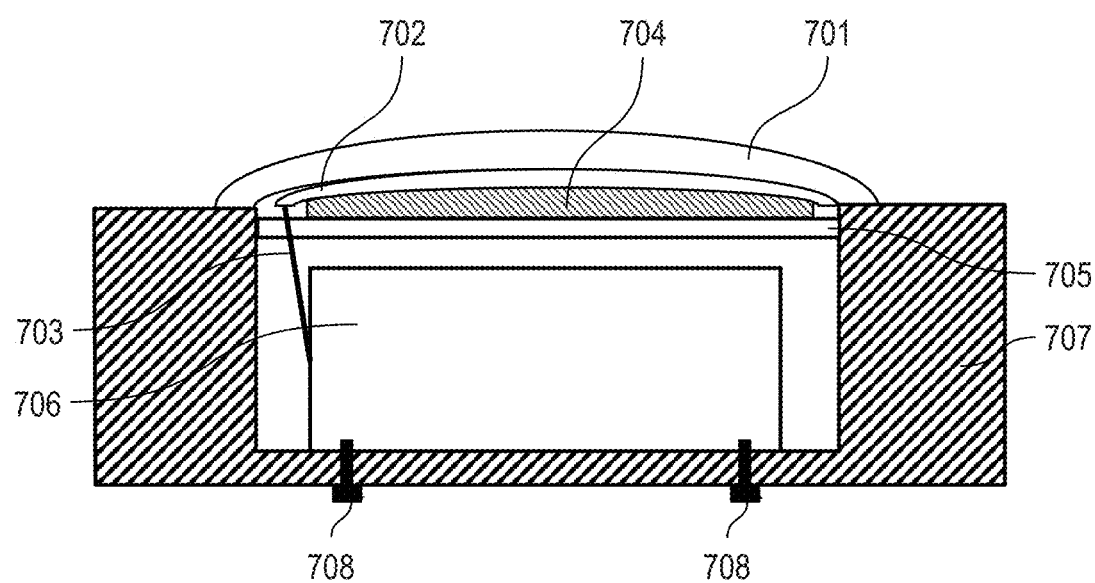
FIG. 11 is a third configuration of the information display terminal according to other embodiments.

This disclosure is also useful to a case that adhered part is only a display, and a cushion member and a cushion pressing member are used as an adhering method. FIG. 11 is a third structure of the information display terminal according to other embodiments. According to FIG. 11, the information display terminal includes surface member 701, display 702, flexible cable 703, cushion member 704, cushion pressing member 705, information terminal body 706, structure 707, and one or more screws 708. Basic configuration and operations of the information display terminal is the same as those of the fourth embodiment according to FIG. 7. But, cushion member 704 and cushion pressing member 705 are used as an adhering method instead of using an adhesive.

Although the foregoing embodiments are described as examples in which the touch panel is a capacitive touch panel, the present disclosure is useful even if the touch panel is another type of touch panel. For example, the response of a resistance type of the touch panel can be improved by removing any air gap between the surface member and the touch panel.

What is claimed is:

1. An information display terminal comprising:
    a surface member that is to be fixed to a structure;
    a touch panel configured to be curved and having a first surface and a second surface that are opposite to each other, the first surface being adhered to the surface member; and
    an information terminal body that is to be attached to the structure and is configured to receive an input from the touch panel, wherein
    the second surface of the touch panel is apart from the information terminal body,
    the information terminal body is configured to be removable from the structure,
    the information terminal body has a display surface facing the second surface of the touch panel, and
    the information terminal body is configured to receive the input from the touch panel to display information on the display surface.

2. The information display terminal according to claim 1, wherein the first surface of the touch panel is adhered to the surface member with adhesive.

3. The information display terminal according to claim 1, further comprising:
    a cushion member that has elasticity and is in contact with the second surface of the touch panel; and
    a cushion pressing member that presses the cushion member toward the surface member such that the first surface of the touch panel is adhered to the surface member due to pressing, wherein
    the cushion member and the cushion pressing member are configured to transmit light from the display surface.

4. The information display terminal according to claim 1, wherein the surface member includes a wall surface that is configured to transmit light from the display surface.

5. The information display terminal according to claim 1, wherein
    the surface member has a curved surface, and
    the first surface of the touch panel is adhered to the curved surface of the surface member.

6. The information display terminal according to claim 1, further comprising a flexible cable that electrically connects the touch panel to the information terminal body.

7. The information display terminal according to claim 1, wherein the information terminal body includes:
    a display having the display surface and configured to display the information on the display surface, and
    a processor configured to receive the input from the touch panel to control the display.

8. The information display terminal according to claim 1, wherein the information terminal body is attached to the structure by one or more fixing tools such that the information terminal body is removable from the structure.

9. The information display terminal according to claim 1, wherein the touch panel is a capacitive touch panel.

10. The information display terminal according to claim 1, further comprising a pressing member that is in contact with the second surface of the touch panel and presses the touch panel toward the surface member such that the first surface of the touch panel is adhered to the surface member due to pressing, wherein the pressing member is configured to transmit light from the display surface.

11. An information display terminal comprising:
    a surface member that is to be fixed to a structure;

a touch panel configured to be curved and having a first surface and a second surface that are opposite to each other, the first surface being adhered to the surface member;

an information terminal body that is to be attached to the structure and is configured to receive an input from the touch panel;

a display configured to be curved and having a first surface and a second surface that are opposite to each other, the first surface of the display being adhered to the second surface of the touch panel, the second surface of the display facing the information terminal body and being apart from the information terminal body;

a cushion member that has elasticity and is in contact with the second surface of the display; and a cushion pressing member that presses the cushion member toward the surface member such that the first surface of the touch panel is adhered to the surface member due to pressing and the first surface of the display is adhered to the second surface of the touch panel due to pressing, wherein the information terminal body is configured to receive the input from the touch panel to cause the display to display information, the information terminal body is configured to be removable from the structure, and the second surface of the touch panel is apart from the information terminal body.

12. An information display terminal comprising:

a surface member that is to be fixed to a structure;

a display configured to be curved and having a first surface and a second surface that are opposite to each other, the first surface being adhered to the surface member;

an information terminal body that is to be attached to the structure, faces the second surface of the display, and is configured to cause the display to display information;

a cushion member that has elasticity and is in contact with the second surface of the display; and a cushion pressing member that presses the cushion member toward the surface member such that the first surface of the display is adhered to the surface member due to pressing, wherein the second surface of the display is apart from the information terminal body, and the information terminal body is configured to be removable from the structure.

13. The information display terminal according to claim 12, wherein the first surface of the display is adhered to the surface member with adhesive.

14. The information display terminal according to claim 12, wherein the surface member includes a wall surface that is configured to transmit light from the display.

15. The information display terminal according to claim 12, wherein the surface member has a curved surface, and the first surface of the display is adhered to the curved surface of the surface member.

16. The information display terminal according to claim 12, further comprising a flexible cable that electrically connects the display to the information terminal body.

17. An information display terminal comprising:

a surface member that is to be fixed to a structure;

a display configured to be curved and having a first surface and a second surface that are opposite to each other, the first surface being adhered to the surface member;

an information terminal body that is to be attached to the structure, faces the second surface of the display, and is configured to cause the display to display information, wherein the second surface of the display is apart from the information terminal body, the information terminal body is configured to be removable from the structure, and the information terminal body is attached to the structure by one or more fixing tools such that the information terminal body is removable from the structure.

18. An information display terminal comprising:

a surface member that is to be fixed to a structure;

a touch panel configured to be curved and having a first surface and a second surface that are opposite to each other, the first surface being adhered to the surface member;

an information terminal body that is to be attached to the structure and is configured to receive an input from the touch panel;

a display configured to be curved and having a first surface and a second surface that are opposite to each other, the first surface of the display being adhered to the second surface of the touch panel, the second surface of the display facing the information terminal body and being apart from the information terminal body; and a pressing member that is in contact with the second surface of the display and presses the touch panel and the display toward the surface member such that the first surface of the touch panel is adhered to the surface member due to pressing and the first surface of the display is adhered to the second surface of the touch panel due to pressing, wherein the second surface of the touch panel is apart from the information terminal body, the information terminal body is configured to be removable from the structure, and the information terminal body is configured to receive the input from the touch panel to cause the display to display information.

19. An information display terminal comprising:

a surface member that is to be fixed to a structure;

a display configured to be curved and having a first surface and a second surface that are opposite to each other, the first surface being adhered to the surface member;

an information terminal body that is to be attached to the structure, faces the second surface of the display, and is configured to cause the display to display information; and a pressing member that is in contact with the second surface of the display and presses the display toward the surface member such that the first surface of the display is adhered to the surface member due to pressing, wherein the second surface of the display is apart from the information terminal body, and the information terminal body is configured to be removable from the structure.

20. An information display terminal comprising:

a surface member that is to be fixed to a structure;

a touch panel configured to be curved and having a first surface and a second surface that are opposite to each other, the first surface being adhered to the surface member;

an information terminal body that is to be attached to the structure and is configured to receive an input from the touch panel; and a display configured to be curved and having a first surface and a second surface that are opposite to each other, the first surface of the display being adhered to the second surface of the touch panel, the second surface of the display facing the information terminal body and being apart from the information terminal body, wherein the second surface of the touch panel is apart from the information terminal body, the information terminal body is configured to be removable from the structure, the information terminal body is configured to receive the input from the touch panel to cause the display to display information, and the information terminal body is attached to the structure by one or more fixing tools such that the information terminal body is removable from the structure.

* * * * *